United States Patent [19]

Neubauer

[11] Patent Number: 5,472,767
[45] Date of Patent: Dec. 5, 1995

[54] NATURAL WOOD PANEL AND NATURAL WOOD LAMINATED PANEL

[76] Inventor: Josef Neubauer, Sillebrucke 5, A-9064 Pischeldorf, Karnten, Austria

[21] Appl. No.: 200,882

[22] Filed: Feb. 22, 1994

[30] Foreign Application Priority Data

Feb. 25, 1993 [AT] Austria ........................... 359/93
Mar. 31, 1993 [AT] Austria ........................... 648/93
Sep. 28, 1993 [EP] European Pat. Off. ........ 93890189

[51] Int. Cl.⁶ ............................................. B32B 5/12
[52] U.S. Cl. ........................... 428/105; 156/297; 156/299; 428/106; 428/107; 428/108; 428/109; 428/113; 428/114; 428/298; 428/537.1; 428/541
[58] Field of Search .................... 428/105, 106, 428/107, 108, 109, 113, 537.1, 298, 114, 541; 156/297, 299

[56] References Cited

U.S. PATENT DOCUMENTS

| | | | |
|---|---|---|---|
| 3,447,996 | 6/1969 | Himmelheber | 428/113 |
| 3,916,059 | 10/1975 | Molloy et al. | 428/298 |
| 4,271,649 | 6/1981 | Belanger | 428/537.1 |
| 4,508,772 | 4/1985 | Churchland | 428/106 |
| 4,704,316 | 11/1987 | Grace | 428/106 |
| 5,034,259 | 7/1991 | Barker | 428/537.1 |

FOREIGN PATENT DOCUMENTS

| | | | |
|---|---|---|---|
| 240035 | 9/1964 | Austria . | |
| 240593 | 10/1964 | Austria . | |
| 380652 | 6/1986 | Austria . | |
| 0198256 | 10/1986 | European Pat. Off. . | |
| 0236283 | 9/1987 | European Pat. Off. . | |
| 1703352 | 7/1972 | Germany . | |
| 2102652 | 8/1972 | Germany . | |
| 104251 | 3/1974 | Germany . | |
| 2049089 | 2/1978 | Germany . | |
| 2922046 | 12/1980 | Germany . | |
| 2938062 | 7/1983 | Germany . | |
| 3326843 | 2/1985 | Germany . | |
| 3936314 | 5/1991 | Germany . | |
| 4126712 | 3/1992 | Germany . | |
| 7905252 | 1/1981 | Netherlands | 428/106 |
| 557222 | 12/1974 | Switzerland . | |
| 557223 | 12/1974 | Switzerland . | |
| 563852 | 7/1975 | Switzerland . | |

*Primary Examiner*—Nasser Ahmad
*Attorney, Agent, or Firm*—Young & Thompson

[57] ABSTRACT

In the natural wood panel according to the invention, the fibers (10) are inclined to the panel plane (2) at an angle ($\alpha$) between 0° and 90°, especially between 20° and 70°. The panel has at least one layer of such natural wood panels (2) joined with one another, in which the fibers (10) of the panels (2) point in the same direction or, in another embodiment, in different directions. At least one other layer can be provided which is joined with the layer of natural wood panels (2), and this layer can also be a natural wood laminated panel or a layer of wood, wood fiber substances, sound-absorbing, heat-insulating, radiation-repelling or heat-conducting material.

12 Claims, 3 Drawing Sheets

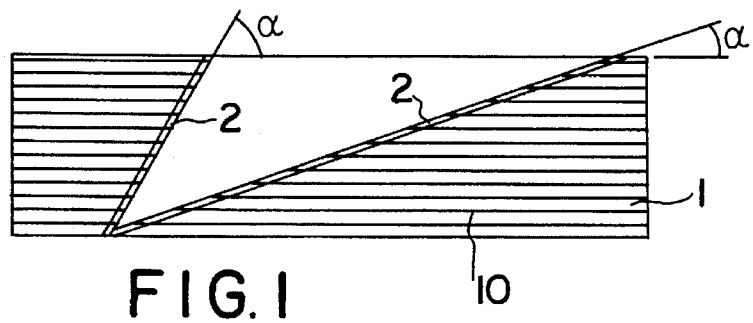
FIG. 1
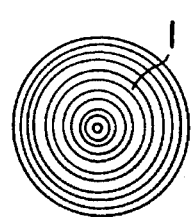 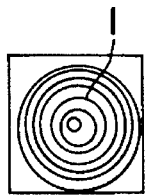 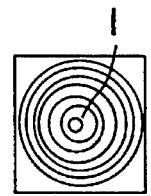 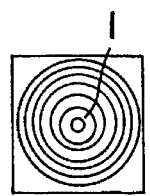 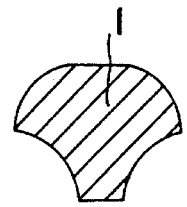
FIG. 2   FIG. 3   FIG. 4   FIG. 5   FIG. 6
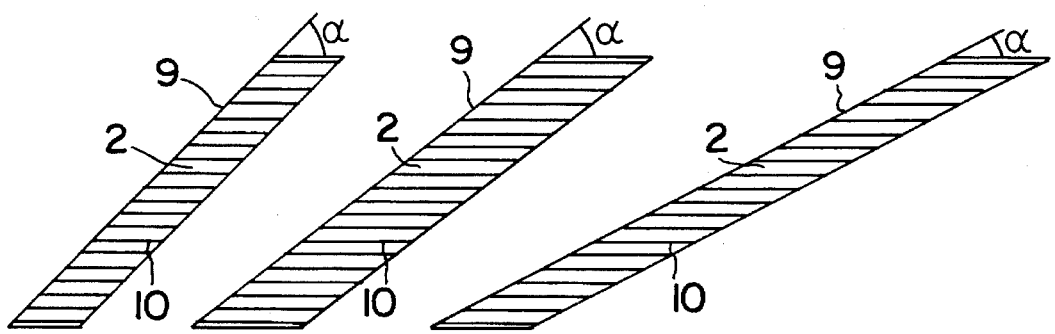
FIG. 7   FIG. 8   FIG. 9

NATURAL WOOD PANEL AND NATURAL WOOD LAMINATED PANEL

BACKGROUND OF THE INVENTION

The invention relates to a natural wood panel and to a natural wood laminated panel. Natural wood panels are used, e.g., for the production of parquet floors or natural wood laminated panels, which as a rule are produced from at least two, in general three or four layers of natural wood panels, such as boards, but also beams. It is common to all known natural wood panels or boards and beams that the fiber orientation of the wood runs parallel to the natural wood panel plane or longitudinal axis of the beam.

Such natural wood panels or natural wood laminated panels are known, for example, from U.S. Pat. No. 3,531,352, DE-OS 2 404 415, DE-OS 39 36 314, EP-A-387 902 and CH-PS 620 854.

It is disadvantageous in these natural wood panels or natural wood laminated panels that they exhibit only a very small surface bonding strength, especially when using soft woods of low density, i.e., that, e.g., parquet floors exhibit only a very low durability and that, on the other hand, only high-grade wood of the rhizome can be used, in which no knots or only very few are present, since the later have both a visible effect and an effect pertaining to strength on the finished product with the longitudinal fiber orientation.

The object of the invention is to make available a natural wood panel which does not exhibit the above-mentioned draw-backs.

SUMMARY OF THE INVENTION

According to the invention, this object is achieved in that the fibers are inclined at an angle $\alpha$ between 0° and 90° to the panel plane.

By the natural Wood panel according to the invention, both the surface bonding strength is increased by the orientation of the fibers at an angle to the surface of the natural wood panel and it becomes possible to use wood from tree trunks starting from a diameter of about 12 cm, in which there are many branches, since it is possible, on the one hand, i.a., to easily avoid branches by the selection of the angle of intersection to the longitudinal axis of the tree trunk and, on the other hand, if necessary, branches present in the natural wood panel are not felt to be disruptive, since the grain of the wood is visible by the oblique angle of intersection in contrast to a section parallel to the fiber direction and branches are integrated in the overall scheme of the grain.

When natural wood panels are mentioned previously and subsequently, primarily panels with a thickness of preferably 4 to 20 mm are meant. However, the invention is not limited to this, but extends also to natural wood products, which exhibit, for example, more likely a beam or parallelepiped block shape than a panel shape.

The angle at which the fibers are oriented to the panel plane or in the case of beam-shaped woods to their longitudinal axis, lies in the range between 0 and 90°, i.e., in special cases, it can also be only a few degrees, for example, 3° or 4°, but also approximately 90°, for example, 86° or 87°. in most cases, however, the angle will be between 20° and 70°, since here there are both a high surface bonding strength and an adequate bending and tensile strength of the natural wood panel.

The invention further relates to a natural wood laminated panel, which is characterized according to the invention in that it exhibits at least one layer of natural wood panels joined with one another according to the invention. In this connection, the individual natural wood panels can exhibit the same or different sizes, by which the most varied patterns can be produced. In this connection, the individual panels can be mechanically joined with one another under the effect of heat and pressure by a bonding material with devices especially suitable in this respect, and then are subjected to surface working.

According to preferred embodiments of the invention, it can be provided that the fibers of the natural wood panels point in the same direction or that the fibers of the natural wood panels point in different directions. In particular in the embodiment in which the fibers of the natural wood panels point in different directions, it is possible to influence both the optical appearance of the natural wood laminated panel and its mechanical strength as desired. In this connection, embodiments are conceivable in which the angle of the fibers to the natural wood panel plane in all natural wood panels is the same, but the fibers are oriented in different directions by suitable arrangement of the natural wood panels to one another. In a like manner, it is conceivable that the angle of the fibers in the individual natural wood panels is also different.

According to another embodiment of the invention, it can be provided that there is at least one other layer, which is joined with the layer of natural wood panels.

In this connection, it can be provided either that at least one other layer is a natural wood laminated panel according to the invention or that at least one other layer is produced from wood, wood fiber materials, sound-absorbing, heat-insulating, radiation-repelling or heat-conducting material.

If it is provided that at least one other layer is a natural wood laminated panel according to the invention, it can then preferably be provided that the fibers of the individual layers of the natural wood laminated panel point in different directions. In this way, two-layer or multilayer laminated panels can be produced which exhibit both a very high surface bonding strength, i.e., compression strength, and a high bending and tensile strength, which is assured in particular by the different orientations of the fibers in the individual layers. In this connection, it can be provided either that in each layer the orientation of the fibers is the same, but the orientation of the fibers of the individual layers to one another is different, or that both the orientation of the fibers within the individual layers and the individual layers to one another is different.

BRIEF DESCRIPTION OF THE DRAWINGS

Other features and advantages of the invention follow from the subclaims and the following description of the embodiment of the invention with reference to the drawings.

FIG. 1 shows two embodiment, as examples, on solid wood, in which angles the natural wood panels can be separated from solid wood, FIGS. 2 to 6 show front views of the solid wood of FIG. 1 in the form of a round, solid, half-round, quarter or shaped timber, FIGS. 7, 8 and 9 show natural wood panels in section, in which the fibers are oriented at an angle of 45°, 40° or 30° to the panel plane.

DESCRIPTION OF THE PREFERRED EMBODIMENT

Figure 13:
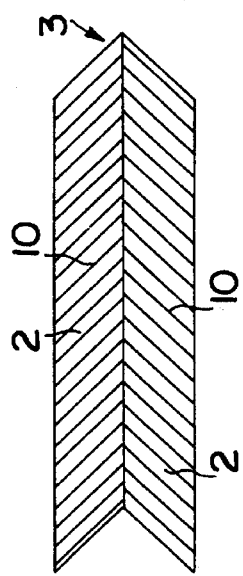
FIGS. 13 to 15 show embodiments of natural wood laminated panels, in which two or more layers of natural wood panels according to the invention are joined with one another with the same or different fiber direction.

FIG. 1 shows solid wood 1, for example, a premachined beam or an unmachined tree trunk whose fibers are indicated by lines designated by 10. On solid wood 1, two of these natural wood panels 2 to be separated are represented, which are inclined at an angle α of 60° or 20° to the direction of fibers 10.

FIGS. 2 to 6 show different possible cross section shapes of the solid wood of FIG. 1, from which natural wood panels 2 can be separated at an angle between 0° and 90° to the longitudinal axis of the solid wood, i.e., to its fiber direction.

FIGS. 7 to 9 show natural wood panels 2 in section, and the fibers are again designated 10. Fibers 10 enclose an angle of 45° (FIG. 7), 40° (FIG. 8) or 30° (FIG. 9) with the panel planes, i.e., with surfaces 9 of natural wood panels 2. In this connection, the amount of the angle can, as already mentioned above, by the most varied boundary conditions, such as the desired grain of the wood, the necessary strength of natural wood panel 2 or the natural wood laminated panel to be produced from it, depend on branches or other defects to be avoided in separation from solid wood.

Figure 10:
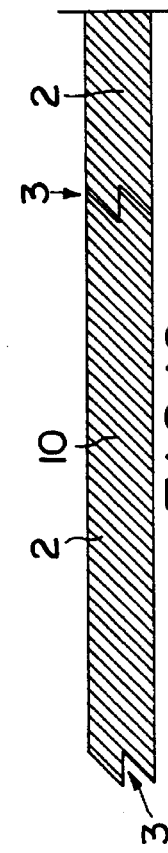
FIG. 10 shows a natural wood panel laminate in the form of a single layer, in which the individual natural wood panels are joined with one another by a toothlike joint.

FIG. 10 shows a single-layer natural wood laminated panel which exhibits natural wood panels 2 joined with one another by a toothlike joint 3. Individual natural wood pan. Is 2 can be securely glued with one another via toothlike joints 3, e.g., by the effect of heat and pressure. Instead of toothlike joint 3, any other suitable joint can, of course, also be used.

Figure 11:
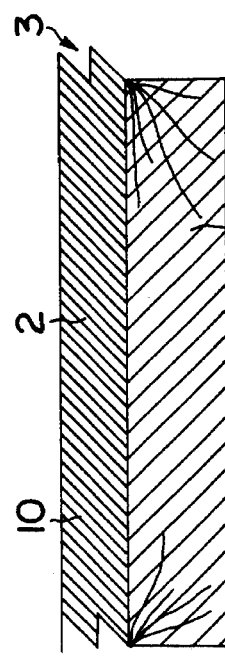
FIG. 11 shows a natural wood laminated panel composed of two layers, in which one layer is made from natural wood panels according to the invention and the second layer is made as a carrier panel.

FIG. 11 shows a natural wood laminated panel, one layer consists of natural wood panels 2, according to the invention and a second layer 4 consists of a carrier panel of any material. The material of the carrier panel can be, for example, as known in the art, wood, wood fiber materials, sound-absorbing, heat-insulating or radiation-repelling material.

Figure 12:
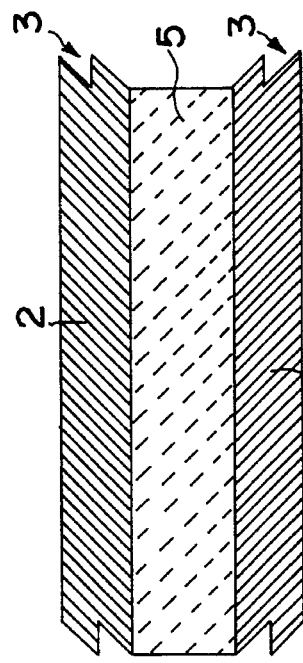
FIG. 12 shows a natural wood panel laminate, in which a layer of insulating material is placed between an upper and lower layer of natural wood panels according to the invention.
Figure 16:
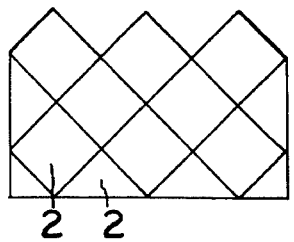
FIGS. 16 to 20 show natural wood laminated panels which are composed of natural wood panels of various shapes.
Figure 17:
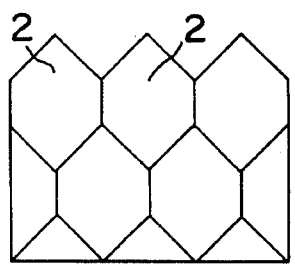
Figure 18:
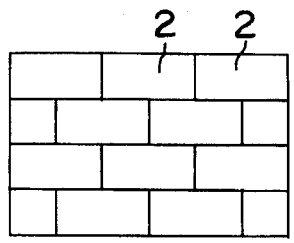
Figure 19:
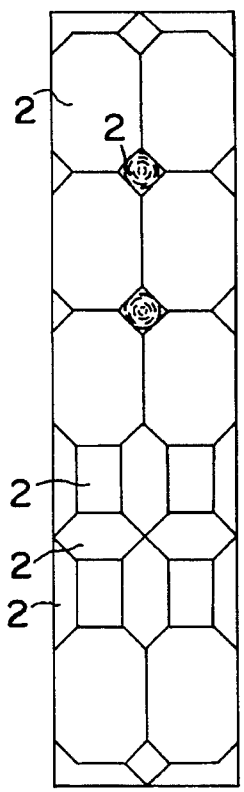
Figure 20:
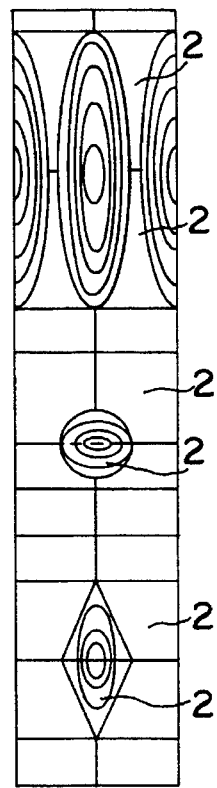

FIG. 12 shows a natural wood laminated panel which consists of an upper and lower layer of natural wood panels 2, whose orientation of the fibers to one another is not parallel, but inclined. As a result, both the bending and the tensile strength of the natural wood laminated panel can be significantly increased. A layer 5 of insulating material is placed between the layers of natural wood panels 2.

In FIG. 13 shows a natural wood laminated panel which exhibits two layers of natural wood panels 2 of the same thickness, in which fiber direction 10 in the two layers is different.

Figure 14:
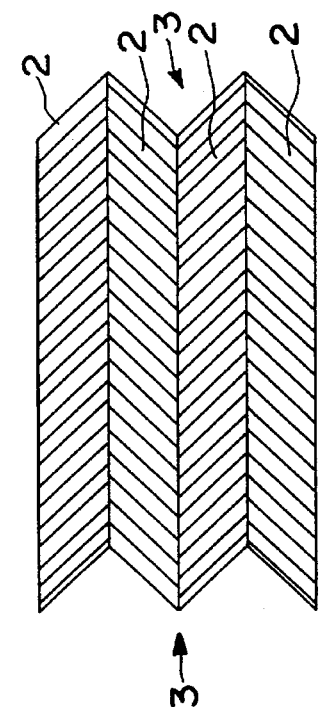

FIG. 14 shows a natural wood laminated panel made of four equally thick layers which consist of natural wood panels 2 according to the invention and in which fiber direction 10 of adjacent natural wood panels 2 is different.

Figure 15:
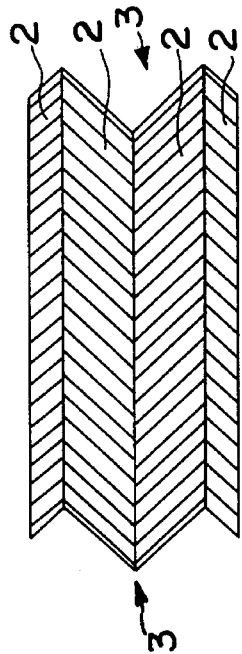

FIG. 15 shows a natural wood laminated panel made of four layers which also consist of natural wood panels 2 according to the invention. In the embodiment according to FIG. 15, however, outside layers 2 consisting, e.g., of ornamental woods, are thinner than the middle layers consisting, e.g., of inferior wood.

FIGS. 16 to 20 show natural wood laminated panels which are produced from natural wood panels 2, according to the invention, of the same or different shape.

In all described embodiments, the orientation of fibers 10 within one layer can be either the same or different, by which both the strength and the appearance of the natural wood laminated panel can be influenced.

In summary, the invention can be represented as follows:

In the natural wood panel according to the invention, fibers 10 are inclined to panel plane 2 at an angle α between 0° and 90°, especially between 20° and 70°.

A natural wood laminated panel exhibits at least one layer of such natural wood panels 2 joined with one another, in which fibers 10 of natural wood panels 2 can point in the same direction or in different directions.

At least one other layer can be provided which is joined with the layer of natural wood panels 2, and this layer can likewise be a natural wood laminated panel or a layer of wood, wood fiber materials, sound-absorbing, heat-insulating, radiation-repelling or heat-conducting material.

What is claimed is:

1. A unitary natural wood panel, which has been cut from a single piece of natural wood and which is flat and lies in a plane, the panel having been so cut from said wood that fibers of the wood are disposed at an acute angle to said plane which is greater than 0° but less than 90°.

2. A natural wood panel according to claim 1, wherein said angle is between 20° and 70°.

3. A natural wood laminated panel, which comprises at least two layers of natural wood panel according to claim 1, fixedly secured together.

4. A natural wood laminated panel according to claim 3, wherein fibers of said natural wood panels point in the same direction.

5. A natural wood laminated panel according to claim 3, wherein said fibers point in different directions.

6. A natural wood laminated panel according to claim 3, wherein there is at least one other layer which is joined with the at least two layers of natural wood panels.

7. A natural wood laminated panel according to claim 6, wherein said at least one other layer is a second natural wood laminated panel.

8. A natural wood laminated panel according to claim 7, wherein the fibers of the individual layers of the natural wood panels point in different directions.

9. A natural wood laminated panel according to claim 6, wherein the thickness of said layers is different.

10. A natural wood laminated panel according to claim 6, wherein the thickness of said layers is the same.

11. A natural wood laminated panel according to claim 3, wherein there are more than two said natural wood panels and the fibers of adjacent said natural wood panels are inclined in opposite directions from each other.

12. A natural wood laminated panel according to claim 3, there being a pair of natural wood panels on opposite sides of and secured to a central layer of material of a thickness greater than said natural wood panels, and the fibers of one said natural wood panel are inclined in a direction opposite the direction of inclination of the fibers of the other said natural wood panel.

* * * * *